(12) United States Patent
Ortiz et al.

(10) Patent No.: US 12,064,744 B2
(45) Date of Patent: Aug. 20, 2024

(54) ZEOLITIC AGGLOMERATED MATERIAL, PREPARATION PROCESS AND USE FOR NON-CRYOGENIC GAS SEPARATION

(71) Applicant: Arkema France, Colombes (FR)

(72) Inventors: Guillaume Ortiz, Lacq (FR); Cécile Lutz, Lacq (FR); Quitterie Persillon, Lacq (FR); Sylvie Szendrovics, Lacq (FR)

(73) Assignee: Arkema France, Colombes (FR)

( * ) Notice: Subject to any disclaimer, the term of this patent is extended or adjusted under 35 U.S.C. 154(b) by 501 days.

(21) Appl. No.: 17/416,349

(22) PCT Filed: Dec. 16, 2019

(86) PCT No.: PCT/FR2019/053080
§ 371 (c)(1),
(2) Date: Jun. 18, 2021

(87) PCT Pub. No.: WO2020/128270
PCT Pub. Date: Jun. 25, 2020

(65) Prior Publication Data
US 2022/0072505 A1      Mar. 10, 2022

(30) Foreign Application Priority Data

Dec. 21, 2018 (FR) ..................... 1873871

(51) Int. Cl.
*B01J 20/18* (2006.01)
*B01D 53/04* (2006.01)
(Continued)

(52) U.S. Cl.
CPC .............. *B01J 20/18* (2013.01); *B01D 53/04* (2013.01); *B01J 20/28004* (2013.01);
(Continued)

(58) Field of Classification Search
None
See application file for complete search history.

(56) References Cited

U.S. PATENT DOCUMENTS

| | | |
|---|---|---|
| 3,140,931 A | 7/1964 | McRobbie |
| 3,140,933 A | 7/1964 | McKee |

(Continued)

FOREIGN PATENT DOCUMENTS

| | | |
|---|---|---|
| EP | 0893157 A1 | 1/1999 |
| FR | 2766476 A1 | 1/1999 |

(Continued)

OTHER PUBLICATIONS

Indian Examination Report for Indian Application No. 202117026771, dated Nov. 29, 2021 with translation, 6 pages.

(Continued)

*Primary Examiner* — Jason M Greene
(74) *Attorney, Agent, or Firm* — Buchanan Ingersoll & Rooney PC

(57) ABSTRACT

The present invention relates to new zeolitic adsorbent materials which are particularly specific and adapted for the non-cryogenic separation of gases, and more particularly for the separation of nitrogen by adsorption in gas streams such as air, and also for the purification of hydrogen by adsorption of carbon monoxide (CO) and/or nitrogen ($N_2$), and also to the use thereof especially for the preparation of medical oxygen in oxygen concentrators for respiratory assistance.

12 Claims, 1 Drawing Sheet

(51) Int. Cl.
  *B01J 20/28* (2006.01)
  *B01J 20/30* (2006.01)

(52) U.S. Cl.
  CPC ..... *B01J 20/28011* (2013.01); *B01J 20/2803* (2013.01); *B01J 20/3007* (2013.01); *B01J 20/3028* (2013.01); *B01J 20/3042* (2013.01); *B01J 20/3085* (2013.01); *B01D 2253/1085* (2013.01); *B01D 2253/304* (2013.01); *B01D 2256/12* (2013.01); *B01D 2256/16* (2013.01); *B01D 2257/102* (2013.01); *B01D 2257/502* (2013.01); *B01D 2259/4533* (2013.01)

(56) References Cited

U.S. PATENT DOCUMENTS

| | | | |
|---|---|---|---|
| 6,425,940 B1 | 7/2002 | Chao et al. | |
| 6,652,626 B1 | 11/2003 | Plee | |
| 9,061,918 B2 | 6/2015 | Bouvier et al. | |
| 10,675,607 B2 | 6/2020 | Laroche et al. | |
| 11,007,505 B2 | 5/2021 | Ortiz et al. | |
| 2010/0196213 A1* | 8/2010 | Lutz | B01J 20/28011 502/68 |
| 2012/0227584 A1* | 9/2012 | Wang | B01J 20/28004 502/79 |
| 2013/0340612 A1 | 12/2013 | Ackley et al. | |
| 2016/0207024 A1 | 7/2016 | Bouvier et al. | |
| 2018/0214848 A1* | 8/2018 | Bouvier | B01J 20/2803 |
| 2019/0388871 A1* | 12/2019 | Ortiz | B01J 20/2803 |

FOREIGN PATENT DOCUMENTS

| | | | | |
|---|---|---|---|---|
| FR | 2925478 A1 | 6/2009 | | |
| JP | 2010529939 A | 9/2010 | | |
| JP | 2016534014 A | 11/2016 | | |
| JP | 2017-531549 A | * 10/2017 | ............. | B01J 20/18 |
| JP | 2017531549 A | 10/2017 | | |
| TW | 201515700 A | 5/2015 | | |
| WO | 2014176002 A1 | 10/2014 | | |
| WO | 2018100318 A1 | 6/2018 | | |
| WO | WO 2018/100318 A1 | * 6/2018 | ............. | B01J 20/18 |

OTHER PUBLICATIONS

Taiwan Search Report for Taiwan Application No. 108147118, dated Jun. 26, 2020, 1 page.
International Search Report and Written Opinion for International Application No. PCT/FR2019/053080, dated Apr. 1, 2020, 8 pages.
Japanese Notice of Rejection for Japanese Application No. 2021-535694, dated Jun. 28, 2022, 4 pages.

* cited by examiner

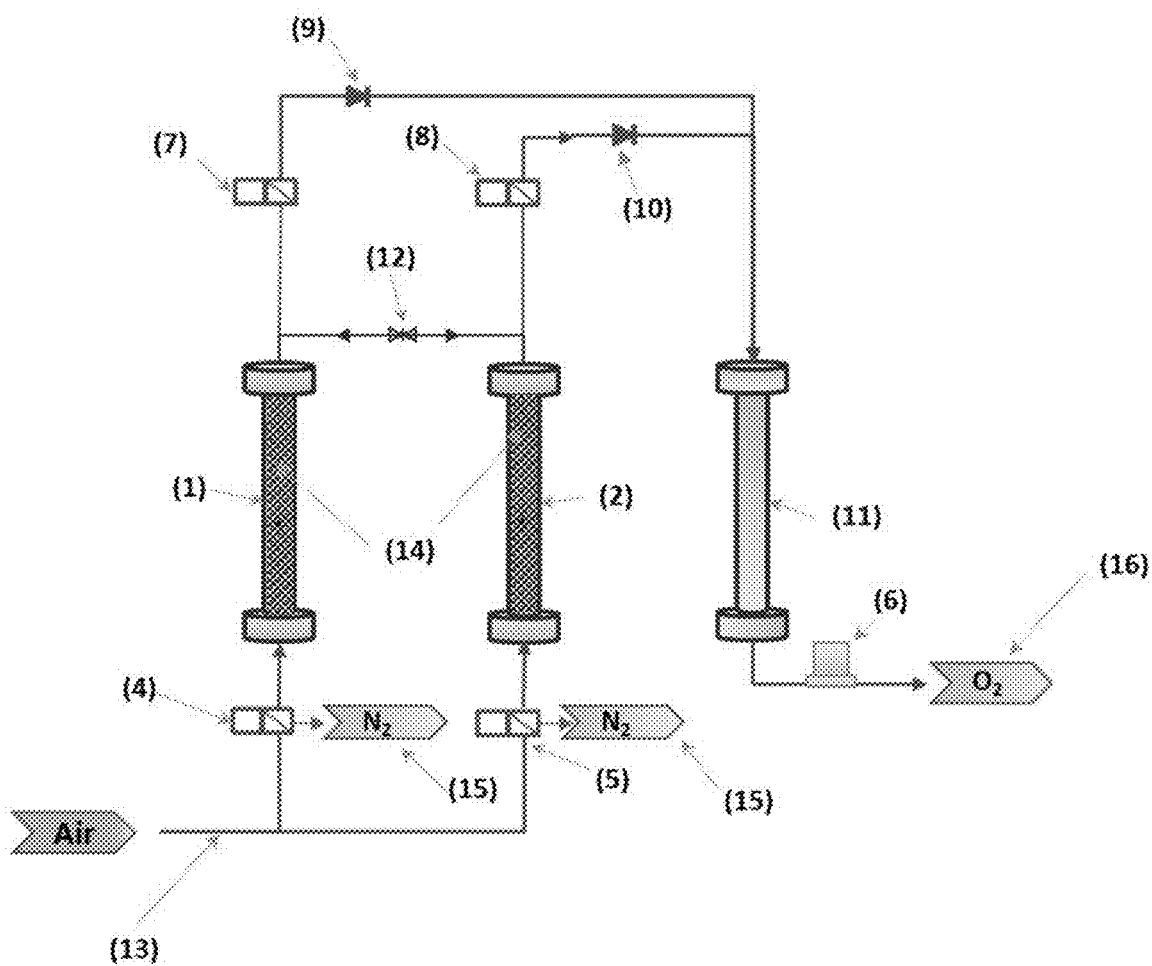

ZEOLITIC AGGLOMERATED MATERIAL, PREPARATION PROCESS AND USE FOR NON-CRYOGENIC GAS SEPARATION

CROSS-REFERENCE TO RELATED APPLICATIONS

This is the national phase of International Application No. PCT/FR2019/053080, filed 16 Dec. 2019, which claims priority to French Application No. FR 1873871, filed 21 Dec. 2018. The disclosure of each of these applications is incorporated herein by reference in its entirety for all purposes.

FIELD OF THE INVENTION

The present invention relates to specific adsorbent materials for the non-cryogenic separation of gases, more particularly for the non-cryogenic separation of industrial gases, and even more particularly for the separation of nitrogen by adsorption in gas streams such as air and also the purification of hydrogen by adsorption of carbon monoxide (CO) and/or nitrogen ($N_2$) or else the preparation of high-purity oxygen from air.

BACKGROUND OF THE INVENTION

The separation of nitrogen from gas mixtures lies at the base of several non-cryogenic industrial processes, including the production of oxygen from air by the process of PSA (Pressure Swing Adsorption) or VPSA (Vacuum and Pressure Swing Adsorption), with the PSA process being one of the most important.

In this application, the air is compressed and sent to a column of adsorbent having a marked preference for the nitrogen molecule. Thus, during the adsorption cycle, oxygen, having a purity of generally between 85% to 95%, and argon are produced. After a certain time, the column is depressurized and then maintained at low pressure, during which period the nitrogen is desorbed. Recompression is then ensured by means of a part of the oxygen produced and/or by air, and then the cycle continues. The advantage of this process over the cryogenic processes lies in the greater simplicity of the plants and in a greater ease of maintenance.

The amount of the adsorbent used remains the key to an effective and competitive process. The performance of the adsorbent is linked to a number of factors, with those deserving a particular mention including the nitrogen adsorption capacity and the selectivity between nitrogen and oxygen, which will be determining factors in the sizing of the columns and the optimization of production yield (ratio between oxygen produced and oxygen introduced), and the adsorption kinetics, which will allow the cycle time to be optimized and the productivity of the plant to be improved.

The use of molecular sieves as selective nitrogen adsorbents is a technology which is nowadays well known. The class of zeolites having a pore diameter of at least 0.4 nm (4 Å) is presented for example in U.S. Pat. No. 3,140,931 for the separation of mixtures of oxygen and nitrogen. The comparative performance of the various ionic forms of the zeolites is described in U.S. Pat. No. 3,140,933, more particularly that of the lithium form, which is presented as being the most effective in terms of selectivity.

Patent application FR2766476 describes an enhanced zeolitic adsorbent for the separation of the gases in the air, and its production process. Said document describes an adsorbent material based on LSX zeolite and comprising lithium, optionally potassium, and having a zeolitized binder. This adsorbent material has a nitrogen adsorption capacity of greater than or equal to 26 $cm^3 \cdot g^{-1}$. Said material is produced starting from at least 95% of LSX zeolite (Si/Al atomic ratio=1) exchanged with lithium. It is found, however, that the mechanical strength of these agglomerates may prove to be insufficient in certain applications.

Document WO 2014/176002 describes a process for the preparation of a zeolitic adsorbent that can be used to separate gaseous compounds, such as oxygen and nitrogen. The size of the beads of the zeolitic adsorbent is typically 1.8 mm.

Patent application US20130340612 describes the preparation and use of an adsorbent powder, such as a zeolite, mixed with a binder to form a zeolite agglomerate in the form of beads. The goal in this publication is to optimize the porous profile in order to optimize separation efficiency. For this purpose, it is indicated, in § [0063], that the bead diameter/crystal diameter ratio must be between 100 and 1000, for an approximately uniform porous structure and good mechanical strength.

The current importance of non-cryogenic processes for separating industrial gases, employing zeolitic adsorbent materials (also called "molecular sieves"), shows that the discovery and the development of increasingly highly performing adsorbents constitutes a major objective both for the gas-producing companies and for the companies supplying said molecular sieves.

SUMMARY OF THE INVENTION

One of the objectives of the present invention is consequently the provision of zeolitic adsorbent materials with improved adsorption capacity compared to existing zeolitic adsorbent materials, for example of LiLSX type, for the separation of industrial gases, in particular for the separation of nitrogen and oxygen, and more particularly for obtaining high-purity oxygen gas for medical use.

Another objective is to further improve the efficiency of medical oxygen concentrators, and in particular to miniaturize the size of the concentrators, for example by reducing the size of the adsorbent beds ("bed size"). To improve the efficiency of such concentrators, one solution could for example be to reduce the size of zeolitic agglomerated materials which constitute the beds of adsorbents present in said concentrators.

BRIEF DESCRIPTION OF THE DRAWINGS

The FIGURE shows an assembly for carrying out a $N_2/O_2$ separation test on two fixed beds of adsorbent with pressure swing adsorption (PSA).

DETAILED DESCRIPTION OF THE INVENTION

It has now been discovered that the abovementioned objectives are achieved, entirely or at least in part, by virtue of the present invention. Other further objectives will become apparent from the description of the invention which follows.

The present invention thus proposes new high-capacity zeolitic adsorbent materials from crystals of LSX zeolite, containing lithium, for the non-cryogenic separation of industrial gases by (V)PSA, more particularly for the separation of nitrogen and oxygen ($N_2/O_2$), and very particularly for the preparation of medical oxygen from air, and also for the industrial preparation of oxygen by (V)PSA.

Thus, and according to a first aspect, a subject of the present invention is a zeolitic agglomerated material in the form of a zeolite agglomerate particle comprising at least one zeolite and at least one binder, said zeolitic agglomerated material having a ratio of the volume-average diameter of said zeolite agglomerate particle relative to the number-average diameter of the zeolite crystals less than or equal to 70, and of which the volume-average diameter of said zeolite agglomerate particle is between 20 μm and 400 μm, preferably between 50 μm and 380 μm, limits included.

The ratio of the volume-average diameter of said zeolite agglomerate particle relative to the number-average diameter of the zeolite crystals is generally and advantageously greater than 1, preferably greater than 2, even more preferably greater than 4. According to one preferred embodiment, this ratio is between 70 and 4, more preferably between 70 and 5.

According to one preferred embodiment, the zeolitic agglomerated material according to the invention comprises at least FAU-type zeolite crystals, said material having an Si/Al atomic ratio of between 1 and 2.5, preferably between 1 and 2.0, more preferably between 1 and 1.8, and entirely preferably between 1 and 1.6, measured by X-ray fluorescence, with a measurement uncertainty of +0.05.

According to one preferred embodiment, the zeolitic agglomerated material according to the invention comprises FAU-type zeolite crystals with an Si/Al atomic ratio of between 1.00 and 1.50, preferably between 1.00 and 1.40, more preferably between 1.00 and 1.15, limits included.

Advantageously, the zeolitic agglomerated material according to the invention comprises crystals of FAU-type zeolite, and more particularly of LSX-type or "Low Silica X"-type zeolite, that is to say of zeolite with an Si/Al atomic ratio equal to 1.00±0.05. These zeolite crystals are well known to those skilled in the art and can be prepared according to any known means and for example by reproducing and/or adapting the procedures described in application FR2925478.

According to yet another preferred embodiment, the zeolitic agglomerated material of the invention has a lithium content, expressed by weight of $Li_2O$, of between 8.0% and 12.0% by weight, limits included, preferably between 9.0% and 12.0%, limits included, more preferably between 10% and 12.0% by weight, limits included, relative to the total weight of the zeolitic agglomerated material.

According to one embodiment, the zeolite crystals used in the zeolitic agglomerated material of the present invention have a number-average diameter ($d_{50}$) of between 5.0 μm and 20.0 μm, preferably of between 5.0 μm and 15.0 μm.

The average diameter of the crystals may be modulated in particular according to the operating conditions of synthesis, and for example, by modulation of one or more of the following parameters: composition of the synthesis medium, shear rate applied to it, addition in smaller or larger amounts of seeds to the synthesis medium, temperature of the synthesis medium, duration of synthesis and the like, according to techniques well known to those skilled in the art.

In an advantageous embodiment of the present invention, the zeolitic material has a non-zeolite phase (NZP), such that 0<NZP≤25%, preferably 0<NZP≤20%, more preferably 0<NZP≤15%, advantageously 0<NZP≤10%, even more advantageously 0<NZP≤8%, measured by X-ray diffraction (XRD), by weight relative to the total weight of the zeolitic agglomerated material.

In one embodiment, the zeolitic agglomerated material that can be used in the present invention has an amount of non-zeolitic phase NZP, such that 0<NZP≤7%, more preferably 0.5% NZP≤5%, measured by XRD, by weight relative to the total weight of the zeolitic agglomerated material.

The zeolitic agglomerated material according to the invention is in the form of solid particles of size, expressed in volume-average diameter, most often of between 20 μm and 400 μm, and entirely preferably of between 50 μm and 380 μm, limits included.

The zeolitic agglomerated material is obtained according to any agglomeration and shaping process known to those skilled in the art and, for example, in a limiting manner by means of processes in which shaping by agitation and collisions are performed, for example by means of granulator drums, granulator plates, operating for example continuously, or granulator mixers operated in general batchwise, sometimes also called "nodulators", or else by means of processes in which shaping by nebulizing and drying are performed, such as spray-dryers. These various shaping treatments make it possible to achieve the desired shapes and sizes. It should be understood that these treatments may optionally be followed by additional sieving treatments to further refine the target size.

The zeolitic agglomerated material of the present invention also has a bulk density generally of between 0.50 $kg \cdot m^{-3}$ and 0.80 $kg \cdot m^{-3}$, preferably of between 0.55 $kg \cdot m^{-3}$ and 0.75 $kg \cdot m^{-3}$, more preferably of between 0.60 $kg \cdot m^{-3}$ and 0.70 $kg \cdot m^{-3}$.

Said zeolitic agglomerated material of the present invention is also characterized by a very good mechanical strength, and in particular a very good bulk crushing strength (BCS) measured according to the ASTM 7084-04 standard, most often greater than 1.5 MPa, and generally greater than 2.0 MPa, preferably greater than 2.5 MPa.

In a most particularly preferred embodiment of the present invention, the zeolitic agglomerated material has one, two or more, or else all, of the characteristics of the embodiments set forth above.

The total volume of the macropores and mesopores of the zeolitic agglomerated material that can be used in the context of the present invention, measured by mercury intrusion, is advantageously between 0.15 $cm^3 \cdot g^{-1}$ and 0.5 $cm^3 \cdot g^{-1}$, preferably between 0.20 $cm^3 \cdot g^{-1}$ and 0.40 $cm^3 \cdot g^{-1}$ and very preferably between 0.20 $cm^3 \cdot g^{-1}$ and 0.35 $cm^3 \cdot g^{-1}$, the measurements being carried out on the agglomerated material at least 95% exchanged with lithium.

When the zeolitic agglomerated material of the present invention contains several different types of zeolites, these different types of zeolites are determined by XRD. The amount of each type of zeolite is also measured by XRD and is expressed as % by weight relative to the total weight of the adsorbent material.

Consequently, in the present invention, the term "non-zeolite phase" (or "NZP") denotes any phase present in the zeolitic agglomerated material, other than the zeolite(s) defined above, called "zeolite phase" or "ZP". The amount of non-zeolite phase is expressed by the amount to be added to the zeolite phase of the agglomerated material to make the total up to 100%, in other words:

%NZP=100−%ZP, wherein % NZP represents the percentage by weight of NZP and % ZP the percentage by weight of zeolitic phase (ZP), relative to the total weight of the zeolitic agglomerated material. According to a very particularly preferred aspect, the zeolitic agglomerated material of the invention may for example be:

- a material in the form of beads of 400 μm in volume-average diameter, comprising an LSX-type zeolite with a number-average diameter equal to 5 μm, corresponding to a ratio of the volume-average diameter of the particle of adsorbent relative to the number-average diameter of the zeolite crystals equal to 80; or else
- a material in the form of beads of 350 μm in volume-average diameter, comprising an LSX-type zeolite with a number-average diameter equal to 5 μm, corresponding to a ratio of the volume-average diameter of the particle of adsorbent relative to the number-average diameter of the zeolite crystals equal to 70; or else
- a material in the form of beads of 250 μm in volume-average diameter, comprising an LSX-type zeolite with a number-average diameter equal to 10 μm, corresponding to a ratio of the volume-average diameter of the particle of adsorbent relative to the number-average diameter of the zeolite crystals equal to 25; or else
- a material in the form of beads of 300 μm in volume-average diameter, comprising an LSX-type zeolite with a number-average diameter equal to 6 μm, corresponding to a ratio of the volume-average diameter of the particle of adsorbent relative to the number-average diameter of the zeolite crystals equal to 50; or else
- a material in the form of beads of 150 μm in volume-average diameter, comprising an LSX-type zeolite with a number-average diameter equal to 9 μm, corresponding to a ratio of the volume-average diameter of the particle of adsorbent relative to the number-average diameter of the zeolite crystals equal to 17; or else
- a material in the form of beads of 350 μm in volume-average diameter, comprising an LSX-type zeolite with a number-average diameter equal to 11 μm, corresponding to a ratio of the volume-average diameter of the particle of adsorbent relative to the number-average diameter of the zeolite crystals equal to 32;

without this list being limiting.

The invention likewise concerns a process for preparing the zeolitic agglomerated material according to the invention, which comprises the following steps:

a) agglomeration of zeolite crystals, with an agglomeration binder, preferably containing at least 80% by weight of clay(s), shaping, drying and calcining,
b) optional zeolitization of at least a portion of the binder,
c) cationic exchange,
d) optional drying and
e) activation of the zeolitic agglomerated material obtained.

In the above preparation process, all of the amounts indicated are expressed in calcined equivalents, that is to say by weight or as weight percentages, with subtraction of the loss on ignition (LOI) measured on each ingredient introduced. It is also possible to use, in step a), crystals of zeolite at least partially exchanged with rare earths, as described for example in U.S. Pat. No. 5,464,467.

The agglomeration step is a technique that is now well known and is carried out here for example by agglomeration of zeolite crystals with an agglomeration binder, preferably a zeolitizable clay and/or a non-zeolitizable clay. The shaping in step a) is carried out according to the techniques well known to those skilled in the art.

As indicated above, the agglomeration binder used in step a) may be of any type known to those skilled in the art and preferably contains at least 80% by weight of clay(s) relative to the total weight of the agglomeration binder. According to one embodiment of the invention, said clay may comprise at least one zeolitizable clay, that is to say capable of being converted into zeolite according to any means well known to those skilled in the art, for example by caustic digestion.

The term "zeolitizable clay(s)" refers to a clay or a mixture of clays that can be converted into zeolitic material by the action of an alkaline basic solution, by techniques which are now well known to those skilled in the art.

The clays that can be used as agglomeration binder typically belong to the family of kaolinites, halloysites, nacrites, dickites, kaolins and/or metakaolins, clays to which a source of silica can also be added.

It is also possible to incorporate one or more other types of non-zeolitizable clays, such as, for example and without limitation, clays chosen from attapulgites, sepiolites, bentonites, montmorillonites, and others.

It is possible, furthermore, during the agglomeration step a), to incorporate one or more organic additives, particularly with the aim of facilitating the shaping and/or of imparting particular properties to the agglomerated material, such as mechanical stability, porous profiles, and others. These additives are well known to those skilled in the art and may be incorporated in quantities of between 0 and 5% by weight relative to the total weight of said product obtained at the end of step a).

The drying operation of step a) is carried out in a conventional manner, preferably at a temperature generally between 50° C. and 200° C., for example at about 120° C. The calcining of step a) is also carried out according to known processes and is intended to reduce the water content and to impart a mechanical strength to the agglomerate by firing the agglomeration binder. The process is generally carried out by calcining at temperatures greater than 200° C., typically between 250° C. and 700° C., preferably between 300° C. and 650° C., generally under oxidizing and/or inert gas flushing, in particular with gases such as oxygen, nitrogen, air, dry and/or decarbonated air, and oxygen-depleted air, which is optionally dry and/or decarbonated. This calcining is carried out for a few hours, for example between 2 hours and 6 hours.

The optional zeolitization step may be carried out by immersing the agglomerate in an alkaline basic solution, which is generally aqueous, for example an aqueous solution of sodium hydroxide and/or of potassium hydroxide, the concentration of which is preferably greater than 0.5 M. Said concentration is generally less than 5 M, preferably less than 4 M, advantageously less than 3 M. Zeolitization is effected preferably hot (temperature greater than the ambient temperature), typically at temperatures of the order of 80° C. to 100° C., so as to improve the kinetics of the process and so reduce the immersion times to less than 8 hours. Operating at lower temperatures and with longer immersion times would not be outside the scope of the invention, however. Nor would it be outside the scope of the invention to add, during this zeolitization step, a solid or liquid silica source to the basic alkaline solution, for example, sodium silicate or dissolved silica.

By virtue of the zeolitization step b), the conversion into zeolitic material of at least one portion of the zeolitizable clay(s) contained in the binder is obtained. It can then be seen that the zeolitization makes it possible in particular to reinforce the mechanical strength of the agglomerated zeolitic adsorbents.

According to this procedure, and as indicated above, it is easy to accomplish zeolitization of at least 50%, and preferably at least 70%, more preferably at least 80% and more preferably at least 85%, by weight of the zeolitizable clay(s) contained in the binder. The next step is a washing with water, followed by drying.

The cationic exchange carried out in step c) consists in replacing all or at least the majority of the cations present in the exchangeable sites of the product obtained in step b) with lithium.

The term "exchangeable sites" means all the exchangeable sites of the zeolite crystal(s) and those formed by the optional zeolitization of the binder, so that the lithium content (expressed as lithium oxide $Li_2O$) is preferably comprised between 8% and 12% by weight, relative to the total weight of the zeolitic agglomerated material of the present invention.

The techniques possibly used to carry out this cationic exchange are here again well known to those skilled in the art, and described for example in patent EP0893157 and may for example consist in bringing the product obtained in step b) into contact with an aqueous solution of lithium salt, advantageously lithium chloride, for example by immersion and optional agitation, with temperatures between about 10° C. and 90° C., preferably between 20° C. and 80° C. This operation may be repeated one or more times, optionally with aqueous solutions of lithium salt of varying concentrations, in order to achieve the desired degree of exchange, corresponding to the amount of lithium, expressed as the amount of $Li_2O$ present in the zeolitic agglomerated material, as previously expressed.

Besides the exchange with lithium cations, it is also possible to carry out an exchange with one or more other cations from groups IA, IIA, IIIA and IIIB (respectively, columns 1, 2, 13 and 3) of the Periodic Table of the elements, but also with one or more other trivalent ions from the series of the lanthanides or rare earths, the zinc(II) ion, the copper (II) ion, the chromium(III) ion, the iron(III) ion, the ammonium ion and/or the hydronium ion.

The drying operation is carried out in a conventional manner, preferably at a temperature generally between 50° C. and 200° C., for example at about 120° C.

The activation is also carried out according to known processes and is intended to fix the water content, and also the loss on ignition of the zeolitic agglomerated material within optimal limits. The process is generally carried out by heat activation, generally under oxidizing and/or inert gas flushing, with, in particular, gases such as oxygen, nitrogen, air, dry and/or decarbonated air, oxygen-depleted air, which is optionally dry and/or decarbonated, at temperatures greater than 200° C., typically between 250° C. and 700° C., preferably between 300° C. and 650° C. This heat activation is carried out for a few hours, for example between 2 and 6 hours.

The zeolitic agglomerated material according to the present invention can be used in many applications, and can be very advantageously used for the separation of industrial gases and also for the separation of gases from the air and in particular for the production of high-purity medical oxygen, and most particularly in pressure swing processes, such as, for example, the industrial $N_2/O_2$ VPSA, industrial $N_2/O_2$ PSA, medical $N_2/O_2$ VPSA and medical $N_2/O_2$ PSA processes, among others.

The zeolitic agglomerated material according to the present invention most often has a mass adsorption capacity of nitrogen ($N_2$), measured under 1 bar at 25° C., greater than 20 $Ncm^3 \cdot g^{-1}$, preferably greater than 22 $Ncm^3 \cdot g^{-1}$, more preferably greater than 24 $Ncm^3 \cdot g^{-1}$, preferably greater than 25 $Ncm^3 \cdot g^{-1}$, more preferably greater than 26 $Ncm^3 \cdot g^{-1}$, most particularly preferably greater than 27 $Ncm^3 \cdot g^{-1}$.

The adsorption processes employing the zeolitic agglomerated material according to the present invention are usually PSA, VSA or VPSA processes, and preferably PSA or VPSA processes, for $N_2/O_2$ separation in industrial gases and for $N_2/O_2$ separation in equipment for producing medical oxygen.

The zeolitic agglomerated material according to the present invention therefore finds especially advantageous application as an adsorption element in oxygen concentrators for respiratory assistance. According to one particularly advantageous aspect of the invention, the zeolitic agglomerated material according to the invention constitutes the active substance of a consumable cartridge of zeolitic adsorbent, which can be inserted into an oxygen concentrator for respiratory assistance, this concentrator being alternatively transportable, mobile, preferably portable.

Said consumable cartridge of zeolitic adsorbent comprising at least one zeolitic adsorbent material as defined above is also part of the present invention. This cartridge may have any form suitable for easy insertion and replacement in oxygen concentrators for respiratory assistance. According to one embodiment, said cartridge may be produced starting from the zeolitic agglomerated material according to the invention in the form of beads which are made mutually cohesive by virtue of at least one resin, preferably a polymeric resin selected preferably from thermoplastic homo- and/or copolymers, and polycondensates.

Non-limiting examples of such polymeric resins are polyolefins, particularly low- and/or high- and/or ultra-high-density polyethylene, polypropylene, ethylene copolymers, ethylene-vinyl acetate copolymers, polyacrylics, acrylonitrile homo- and/or copolymers, polyacrylates, polymethacrylates, acrylate copolymers and/or methacrylate copolymers, polystyrenes and/or styrene copolymers, polyesters, e.g. polyethylene terephthalate, polybutylene terephthalate, halogenated polymers and copolymers such as poly(vinylidene difluoride) (PVDF) polymers, poly(tetrafluoroethylene) (PTFE) polymers and/or copolymers, polyamides, such as polyamide-11 and polyamide-12, and also other even- and odd-numbered polyamides, aromatic polyamides, polyvinyl chlorides, polyurethanes, polyethersulfones, polyetherketones, polycarbonates, epoxy resins, phenolic resins, thermosetting resins and elastomeric resins, and the like, and also mixtures of two or more of these in any proportions.

As a variant, the consumable cartridge may comprise, in addition to or in place of the zeolitic agglomerated material, a fixed bed of zeolitic agglomerated material according to the invention.

According to yet another aspect, the invention relates to an oxygen concentrator for respiratory assistance, which is transportable, mobile, preferably portable, comprising at least one zeolitic agglomerated material, or at least one fixed adsorption bed, or at least one composite material, or at least one cartridge, of the kind just described above.

It has been observed that the zeolitic agglomerated material according to the present invention has a better volume efficacy than the currently available adsorbent materials. This gain in volume efficacy offers numerous advantages, of which one of the main ones is that of allowing a reduction in the size of equipment, particularly of oxygen concentrators for respiratory assistance.

Analytical Methods

The physical properties of the zeolitic agglomerated material according to the invention are evaluated by methods known to those skilled in the art, the main ones among them being recited below.

The number-average diameter of the zeolite crystals which are used for preparing the zeolitic agglomerated material of the invention is estimated by observation under the scanning electron microscope (SEM).

In order to estimate the size of the zeolite crystals on the samples, a set of images is taken at a magnification of at least 5000. The diameter of at least 200 crystals is then measured using dedicated software, for example the Smile View software published by LoGraMi. The accuracy is of the order of 3%.

The size recorded for each crystal is that of the largest cross section of said crystal in question. Particles with a size of less than 0.5 µm which might possibly be present in the zeolitic agglomerated material are not taken into consideration in the counting.

The resulting particle size distribution is equivalent to the average of the particle size distributions observed for each of the images. The peak width and the number-average diameter are calculated by conventional methods known to those skilled in the art, applying the statistical rules of Gaussian distribution.

Elemental chemical analysis of a zeolitic agglomerated material according to the invention may be carried out according to various analytical techniques which are known to those skilled in the art. These techniques include the technique of chemical analysis by X-ray fluorescence as described in standard NF EN ISO 12677:2011 on a wavelength-dispersive spectrometer (WDXRF), for example Tiger S8 from Bruker.

X-ray fluorescence is a non-destructive spectral technique which exploits the photoluminescence of the atoms in the X-ray range, to establish the elemental composition of a sample. Excitation of the atoms, generally with an X-ray beam or by electron bombardment, generates specific radiations after return to the ground state of the atom. A measurement uncertainty of less than 0.4% by weight is conventionally obtained after calibration for each oxide.

Other methods of analysis are for example illustrated by the atomic absorption spectrometry (AAS) and inductively coupled plasma atomic emission spectrometry (ICP-AES) methods described in standards NF EN ISO 21587-3 or NF EN ISO 21079-3 on a machine of for example Perkin Elmer 4300DV type.

The X-ray fluorescence spectrum has the advantage of depending very little on the chemical combination of the element, which offers a precise determination, both quantitatively and qualitatively. After calibration for each oxide $SiO_2$ and $Al_2O_3$, and also the various oxides (such as those originating from the exchangeable cations, for example sodium), a measurement uncertainty of less than 0.4% by weight is conventionally obtained. The ICP-AES method is particularly suitable for measuring the lithium content which makes it possible to calculate the lithium oxide content.

Thus, the elemental chemical analyses described above make it possible to verify both the Si/Al ratio of the zeolite used within the zeolitic agglomerated material and the Si/Al ratio of the zeolitic agglomerated material. In the description of the present invention, the measurement uncertainty for the Si/Al ratio is +5%. The measurement of the Si/Al ratio of the zeolite present in the agglomerated material can also be carried out by solid silicon nuclear magnetic resonance (NMR) spectroscopy.

The quality of the ion exchange is linked to the number of moles of the cation in question in the zeolitic agglomerated material after exchange. More specifically, the degree of exchange by a given cation is estimated by evaluating the ratio between the number of moles of said cation and the number of moles of all of the exchangeable cations. The respective amounts of each of the cations are evaluated by chemical analysis of the corresponding cations. For example, the degree of exchange by the sodium ions is estimated by evaluating the ratio between the total number of $Na^+$ cations and the total number of exchangeable cations (for example $Ca^{2+}$, $K^+$, $Li^+$, $Ba^{2+}$, $Cs^+$, $Na^+$, etc.), the amount of each of the cations being evaluated by chemical analysis of the corresponding oxides ($Na_2O$, CaO, $K_2O$, BaO, $Li_2O$, $Cs_2O$, etc.). This method of calculation also takes into account the possible oxides present in the residual binder of the zeolitic agglomerated material.

The bulk crushing strength of the zeolitic adsorbent materials as described in the present invention is characterized according to the ASTM 7084-04 standard.

The bulk density of the zeolitic agglomerated material according to the present invention is measured as described in the DIN 8948/7.6 standard.

The purity of the zeolites in the zeolitic adsorbent materials of the invention is evaluated by X-ray diffraction analysis, known to those skilled in the art by the acronym XRD. This identification is carried out on a Bruker XRD machine.

This analysis makes it possible to identify the various zeolites present in the agglomerated material since each of the zeolites has a unique diffractogram defined by the positioning of the diffraction peaks and by their relative intensities.

The zeolitic adsorbent materials are ground and then spread out and smoothed on a sample carrier by simple mechanical compression. The conditions under which the diffractogram created on the Bruker D8 Advance machine is acquired are as follows:

Cu tube used at 40 kV-30 mA;
Soller slit size=2.5°, with an irradiation surface width of 16 mm;
sample device rotating at: 10 rpm;
measuring range: $4°<2\theta<70°$;
increment: 0.015°;
counting time per increment: 0.8 seconds.

Interpretation of the diffractogram obtained is performed with the EVA software with identification of the zeolites using the ICDD PDF-2 release 2011 database.

The amount of the FAU zeolite fractions, by weight, is measured by XRD analysis; this method is also used to measure the amount of the zeolite fractions other than FAU.

This analysis is performed on a Bruker machine, and the amount by weight of the zeolite fractions is then evaluated using the TOPAS software from the company Bruker.

The mass adsorption capacity at 25° C., under 1 bar, of the zeolitic adsorbent material is determined from the measurement of the adsorption isotherm for gases, such as nitrogen or oxygen, at 25° C.

Prior to the adsorption, the zeolitic agglomerated material is degassed at between 300° C. and 450° C. for a time of between 9 hours and 16 hours under vacuum (pressure lower than $6.7.10^{-4}$ Pa). Measurement of the adsorption isotherms is then performed on a machine of ASAP 2020 type from Micromeritics, taking at least 10 measurement points at relative pressures of ratio P/PO between 0.001 and 1.

The mass adsorption capacity of the zeolitic agglomerated material is read off on the isotherm at 25° C. under a pressure of 1 bar, and is expressed in $Ncm^3 \cdot g^{-1}$.

The volume adsorption capacity at 25° C., under 1 bar, of the zeolitic agglomerated material is calculated from the mass adsorption capacity as defined above, by multiplying said mass absorption capacity by the bulk density of said zeolitic agglomerated material. The bulk density is measured as described in the DIN 8948/7.6 standard.

The average volume diameter (or "volume-average diameter") of the zeolitic agglomerated material of the invention is determined by analysis of the particle size distribution of a sample of adsorbent material by imaging in accordance with the ISO 13322-2:2006 standard, using a conveyor belt which allows the sample to pass in front of the camera lens.

The volume-average diameter is then calculated from the particle size distribution by applying the ISO 9276-2:2001 standard. In the present document, the term "volume-average diameter" or else "size" is used for the zeolitic adsorbent materials. The accuracy is of the order of 0.01 mm for the size range of the zeolitic adsorbent materials of the present invention.

The present invention is now described with the aid of the following examples, the aim of which is to illustrate certain embodiments of the invention, without, however, limiting the scope of said invention as claimed in the appended claims.

EXAMPLES

Example 1 (Comparative): Preparation of a Zeolitic Agglomerated Material with LSX Zeolite Crystals of $d_{50}=1.3$ μm In the text below, the masses given are expressed as calcined equivalents.

A homogeneous mixture is prepared, consisting of 1700 g of LSX zeolite crystals of $d_{50}=1.3$ μm, as described in FR2925478 with a shear rate of 135 s$^{-1}$, 300 g of Charentes kaolinite, and the amount of water such that the loss on ignition of the paste before shaping is 39%. The paste thus prepared is used to produce beads of zeolitic agglomerated material.

The beads obtained are selected by sieving in order to recover beads with a diameter of between 0.3 mm and 0.8 mm and a volume-average diameter equal to 0.50 mm.

The beads are dried overnight in a ventilated oven at 80° C. They are subsequently calcined at 550° C. for two hours under a blanket of decarbonated dry air. After cooling, 100 g of these (agglomerated) beads are immersed in 750 ml of aqueous sodium hydroxide solution with a concentration of 100 g·l$^{-1}$, at a temperature regulated at 98° C. The system is held at temperature with gentle stirring for three hours. The agglomerates are then washed with water until the final pH of the washing waters is close to 10.

Next, five successive exchanges are carried out using 1 M lithium chloride solutions, in a proportion of 20 ml·g$^{-1}$ of solid. Each exchange is continued for four hours at 100° C., and intermediate washes are carried out, thus making it possible to remove the excess salt at each step. In the final step, four washes are carried out at ambient temperature, in a proportion of 20 ml·g$^{-1}$. The beads are dried overnight in a ventilated oven at 80° C. They are subsequently activated at 550° C. for two hours under a blanket of decarbonated dry air.

The lithium oxide Li$_2$O content, determined by ICP-AES, is 10.6% by weight, relative to the total weight of the zeolitic agglomerated material. The median diameter of the beads remains unchanged and is 0.50 mm. The mechanical bulk crushing strength of the beads of lithium-exchanged LSX zeolite is 1.4 MPa, the bulk density is 0.58 kg·m$^{-3}$, the Si/Al ratio of the zeolitic material is equal to 1.02, and the NZP is equal to 3%.

The mass adsorption capacity at 25° C. under 1 bar is equal to 24.7 Ncm$^3$·g$^{-1}$. The ratio of the volume-average diameter of the beads/number-average diameter of the LSX crystals is 385.

Example 2 (Comparative): Preparation of a Zeolitic Agglomerated Material with LSX Crystals of $d_{50}=5.6$ μm LSX zeolite crystals of $d_{50}=5.6$ μm are prepared as described in comparative example 1 above, with however a shear rate of 5 s-1. A homogeneous mixture is prepared, consisting of 1700 g of these LSX zeolite crystals of $d_{50}=5.6$ μm with 300 g of Charentes kaolinite, 40 g (in calcined equivalents) of colloidal silica sold under the name Klebosol® 30 and also the amount of water such that the loss on ignition of the paste before shaping is 39%.

The zeolitic agglomerated material is subsequently prepared according to the protocol described in comparative example 1 above.

The lithium oxide Li$_2$O content, determined by ICP-AES, is 10.7% by weight, relative to the total weight of the zeolitic agglomerated material. The volume-average diameter of the beads is 0.50 mm. The mechanical bulk crushing strength (BCS) of the beads of lithium-exchanged LSX zeolite is 2.6 MPa, the bulk density is 0.63 kg·m$^{-3}$, the Si/Al ratio of the zeolitic material is equal to 1.03, and the NZP is equal to 2.7%.

The mass adsorption capacity at 25° C. under 1 bar is equal to 27 Ncm$^3$·g$^{-1}$. The ratio of the volume-average diameter of the beads/number-average diameter of the LSX crystals is 90.

Example 3 (Invention): Preparation of a Zeolitic Agglomerated Material with LSX Crystals of $d_{50}=5.6$ μm and a Ratio of Diameter of the Beads/Diameter of the LSX Crystals=62

LSX zeolite crystals of $d_{50}=5.6$ μm are prepared as described in comparative example 2 above. A homogeneous mixture is then prepared, consisting of 1700 g of LSX zeolite crystals of $d_{50}=5.6$ μm, 300 g of Zeoclay® attapulgite, and also the amount of water such that the loss on ignition of the paste before shaping is 39%.

The paste thus prepared is used to produce beads of zeolitic agglomerated material.

The beads obtained are selected by sieving in order to recover beads with a diameter of between 0.10 mm and 0.50 mm and a volume-average diameter equal to 0.35 mm.

The beads are dried overnight in a ventilated oven at 80° C. They are subsequently calcined at 550° C. for two hours under a blanket of decarbonated dry air.

Next, the lithium cationic exchange is carried out by means of five successive exchanges using 1 M lithium chloride solutions, in a proportion of 20 ml·g$^{-1}$ of solid. Each exchange is continued for four hours at 100° C., and intermediate washes are carried out, thus making it possible to remove the excess salt at each step. In the final step, four washes are carried out at ambient temperature, in a proportion of 20 ml·g$^{-1}$.

The beads are dried overnight in a ventilated oven at 80° C. They are subsequently activated at 550° C. for two hours under a blanket of decarbonated dry air.

The lithium oxide Li$_2$O content, determined by ICP-AES, is 8.9% by weight, relative to the total weight of the zeolitic agglomerated material. The volume-average diameter of the beads is 0.35 mm. The mechanical bulk crushing strength (BCS) of the beads of lithium-exchanged LSX zeolite is 2.1 MPa, the bulk density is 0.63 kg·m$^{-3}$, the Si/Al ratio of the zeolitic material is equal to 1.25, and the NZP is equal to 17%.

The mass adsorption capacity at 25° C. under 1 bar is equal to 21 Ncm$^3$·g$^{-1}$. The ratio of the volume-average diameter of the beads/number-average diameter of the LSX crystals is 62.

Example 4 (Invention): Preparation of a Zeolitic Agglomerated Material with LSX Crystals of $d_{50}$=7 µm and a Ratio of Diameter of the Beads/Diameter of the LSX Crystals=43

LSX zeolite crystals of $d_{50}$=7 µm are prepared as described in comparative example 1 above, with however a shear rate of 2.5 s$^{-1}$. A homogeneous mixture is prepared, consisting of 1700 g of these LSX zeolite crystals of $d_{50}$=7 µm, with 300 g of Zeoclay® attapulgite, and also the amount of water such that the loss on ignition of the paste before shaping is 39%. The paste thus prepared is used to produce beads of zeolitic agglomerated material.

The beads obtained are selected by sieving in order to recover beads with a diameter of between 0.10 mm and 0.50 mm and a volume-average diameter equal to 0.30 mm.

The beads are dried overnight in a ventilated oven at 80° C. They are subsequently calcined at 550° C. for two hours under a blanket of decarbonated dry air.

Next, the lithium cationic exchange is carried out by means of five successive exchanges using 1 M lithium chloride solutions, in a proportion of 20 ml·g$^{-1}$ of solid. Each exchange is continued for four hours at 100° C., and intermediate washes are carried out, thus making it possible to remove the excess salt at each step. In the final step, four washes are carried out at ambient temperature, in a proportion of 20 ml·g$^{-1}$.

The beads are dried overnight in a ventilated oven at 80° C. They are subsequently activated at 550° C. for two hours under a blanket of decarbonated dry air.

The lithium oxide Li$_2$O content, determined by ICP-AES, is 9.2% by weight, relative to the total weight of the zeolitic agglomerated material. The volume-average diameter of the beads is 0.30 mm. The mechanical bulk crushing strength (BCS) of the beads of lithium-exchanged LSX zeolite is 2.1 MPa, the bulk density is 0.63 kg·m$^{-3}$, the Si/Al ratio of the zeolitic material is equal to 1.25, and the NZP is equal to 17%.

The mass adsorption capacity at 25° C. under 1 bar is equal to 22 Ncm$^3$·g$^{-1}$. The ratio of the volume-average diameter of the beads/number-average diameter of the LSX crystals is 43.

Example 5 (Invention): Preparation of a Zeolitic Agglomerated Material with LSX Crystals of $d_{50}$=6.5 µm and a Ratio of Diameter of the Beads/Diameter of the LSX Crystals=38

LSX zeolite crystals of $d_{50}$=6.5 µm are prepared as described in comparative example 1 above, with however a shear rate of 3 s$^{-1}$. A homogeneous mixture is prepared, consisting of 1700 g of these LSX zeolite crystals of $d_{50}$=6.5 µm, with 300 g of Charentes kaolinite, 40 g (in calcined equivalents) of colloidal silica sold under the name Klebosol® 30 and also the amount of water such that the loss on ignition of the paste before shaping is 39%.

The zeolitic agglomerated material is subsequently prepared according to the protocol described in comparative example 1 above.

The lithium oxide Li$_2$O content, determined by ICP-AES, is 10.2% by weight, relative to the total weight of the zeolitic agglomerated material. The volume-average diameter of the beads is 0.25 mm. The mechanical bulk crushing strength (BCS) of the beads of lithium-exchanged LSX zeolite is 2.2 MPa, the bulk density is 0.65 kg·m$^{-3}$, the Si/Al ratio of the zeolitic material is equal to 1.05, and the NZP is equal to 2.8%.

The mass adsorption capacity at 25° C. under 1 bar is equal to 26 Ncm$^3$·g$^{-1}$. The ratio of the volume-average diameter of the beads/number-average diameter of the LSX crystals is 38.

Example 6: Determination of the Column Height for Obtaining Oxygen with a Purity of 95%

An N$_2$/O$_2$ separation test is carried out on two fixed beds of adsorbent with pressure swing adsorption (PSA).

The FIGURE describes the assembly produced. Two columns (1) and (2) with internal diameters equal to 6 cm and equal internal heights, filled with zeolitic agglomerated material (14), are fed with dry air (13) and intermittently depressurized by means of valves (4) and (5). Different sets of columns of different heights are provided. Table 1 indicates the respective state of the valves as a function of the adsorption and desorption phases.

TABLE 1

| Column (1) adsorption phase | Column (2) desorption phase | Column (1) desorption phase | Column (2) adsorption phase |
| --- | --- | --- | --- |
| Valve (4) open | Valve (5) closed | Valve (4) closed | Valve (5) open |
| Valve (7) open | Valve (8) closed | Valve (7) closed | Valve (8) open |

When a column (1 or 2) is fed with dry air, the flow (13) passes through the columns and consequently through the zeolitic agglomerated material (14). Said zeolitic agglomerated material preferably adsorbs nitrogen, so that oxygen-enriched air leaves the column via the valve (7 or 8) and then passes through a non-return valve (9 or 10) and is directed to a buffer tank (11). A regulating valve (6) continuously delivers the gas at outlet (16) at a constant flow rate fixed at 5 NL·min$^{-1}$.

When the column (1 or 2) is not fed, it is depressurized by opening the valve (4 or 5) to the atmosphere (15), which corresponds to the "closed valve" mode, thereby allowing the nitrogen to be desorbed. The adsorption and desorption phases follow on from one another. The durations of these phases are fixed from one cycle to the other and they are adjustable.

The valve 12 is a purge valve. It is permanently open to allow desorption of the nitrogen with a portion of the oxygen produced by the adsorption column. The time for feeding the column (1 or 2) with the stream (13) is called adsorption time.

The test is thus carried out continuously while alternating adsorption and desorption phase. The duration of the cycles of each phase (adsorption/desorption) ranges from 0.5 s to 15 s, this duration being adjusted to the size of the columns.

The dimensions of the columns are determined so as to obtain an oxygen concentration at the outlet of 95%. The oxygen concentration at the outlet (16) is measured by means of a Servomex 570A oxygen analyzer. The results of the test are presented in the following table:

TABLE 2

| Sample | Bead/crystals ratio | Column height (in cm) |
|---|---|---|
| Comp. example 1 | 385 | 33 |
| Comp. example 2 | 90 | 29.5 |
| Example 3 | 62 | 15 |
| Example 4 | 43 | 13 |
| Example 5 | 38 | 10 |

The invention claimed is:

1. A zeolitic agglomerated material in the form of a zeolite agglomerate particle comprising zeolite crystals and at least one binder,
   wherein the zeolitic agglomerated material has a ratio of the volume-average diameter of the zeolite agglomerate particle relative to the number-average diameter of the zeolite crystals of between 4 and 70,
   wherein the zeolite crystals have a number average diameter ($d_{50}$) of between 5.0 μm and 15 μm, and
   wherein the zeolitic agglomerated material has a mass adsorption capacity of nitrogen ($N_2$), measured under 1 bar at 25° C., of greater than 20 Ncm$^3 \cdot$g$^{-1}$.

2. The zeolitic agglomerated material as claimed in claim 1, comprising FAU-type zeolite crystals, the material having an Si/Al atomic ratio of between 1 and 2.5, measured by X-ray fluorescence, with a measurement uncertainty of ±0.05.

3. The zeolitic agglomerated material as claimed in claim 1, having a lithium content, expressed by weight of Li$_2$O, of between 8.0% and 12.0% by weight, limits included, relative to the total weight of the zeolitic agglomerated material.

4. The material as claimed in claim 1, wherein the amount of non-zeolite phase (NZP) is such that 0<NZP≤25%, measured by X-ray diffraction (XRD), by weight relative to the total weight of the zeolitic agglomerated material.

5. The material as claimed in claim 1, having a bulk density of between 0.50 kg·m$^{-3}$ and 0.80 kg·m$^{-3}$.

6. A process for preparing the zeolitic agglomerated material as claimed in claim 1, comprising the following steps:
   a) agglomerating zeolite crystals, with an agglomeration binder, followed by shaping, drying and calcining the resulting zeolitic agglomerate,
   b) optionally subjecting at least a portion of the binder to zeolitization,
   c) subjecting the agglomerate to cationic exchange,
   d) optional drying the agglomerate, and
   e) activating the zeolitic agglomerated material obtained.

7. The process as claimed in claim 6, wherein the optional zeolitization step may be carried out by immersing the agglomerate in an alkaline basic solution.

8. A method for separating nitrogen gas from industrial gases containing nitrogen gas and from the air, the method comprising treating the industrial gases or the air with the material as claimed in claim 1.

9. The method as claimed in claim 8, wherein the material is present in oxygen concentrators for respiratory assistance.

10. A consumable cartridge of zeolitic adsorbent, comprising at least one zeolitic agglomerated material as claimed in claim 1.

11. The cartridge as claimed in claim 10, further comprising at least one resin.

12. An oxygen concentrator for respiratory assistance, which is transportable, mobile, comprising at least one zeolitic agglomerated material as claimed in claim 1.

* * * * *